United States Patent
Frances et al.

(10) Patent No.: US 12,258,483 B2
(45) Date of Patent: Mar. 25, 2025

(54) METHOD FOR THE ADDITIVE MANUFACTURING OF A SILICONE ELASTOMER ARTICLE

(71) Applicants: Elkem Silicones France SAS, Lyons (FR); Elkem Silicones USA Corp., East Brunswick, NJ (US); ELKEM SILICONI ITALIA S.R.L., Caronno Pertusella (IT)

(72) Inventors: Jean-Marc Frances, Meyzieu (FR); Marco Del Torto, Milan (IT); Damien Djian, Genas (FR); Emmanuel Pouget, Lyons (FR); Raphael Mirgalet, Toulouse (FR); Remi Thiria, Fort Mill, SC (US)

(73) Assignees: ELKEM SILICONES FRANCE SAS, Lyons (FR); ELKEM SILICONES USA CORP., East Brunswick, NJ (US); ELKEM SILICONI ITALIA S.R.L., Caronno Pertusella (IT)

( * ) Notice: Subject to any disclaimer, the term of this patent is extended or adjusted under 35 U.S.C. 154(b) by 289 days.

(21) Appl. No.: 17/786,479

(22) PCT Filed: Dec. 18, 2020

(86) PCT No.: PCT/EP2020/087233
§ 371 (c)(1),
(2) Date: Jun. 16, 2022

(87) PCT Pub. No.: WO2021/123315
PCT Pub. Date: Jun. 24, 2021

(65) Prior Publication Data
US 2023/0062134 A1 Mar. 2, 2023

(30) Foreign Application Priority Data
Dec. 20, 2019 (EP) .................................. 19306746

(51) Int. Cl.
*C09D 11/38* (2014.01)
*B29C 64/106* (2017.01)
*B33Y 10/00* (2015.01)
*B33Y 70/00* (2020.01)
*C09D 11/037* (2014.01)
*C09D 11/102* (2014.01)
*B29K 83/00* (2006.01)

(52) U.S. Cl.
CPC ............ *C09D 11/38* (2013.01); *B29C 64/106* (2017.08); *B33Y 10/00* (2014.12); *B33Y 70/00* (2014.12); *C09D 11/037* (2013.01); *C09D 11/102* (2013.01); *B29K 2083/00* (2013.01)

(58) Field of Classification Search
None
See application file for complete search history.

(56) References Cited

U.S. PATENT DOCUMENTS

| 5,216,103 | A | 6/1993 | Silvestro et al. |
|---|---|---|---|
| 2004/0236010 | A1 | 11/2004 | Lee |
| 2005/0020738 | A1 | 1/2005 | Scott et al. |
| 2015/0014881 | A1* | 1/2015 | Elsey .................... B33Y 10/00 425/130 |
| 2015/0028523 | A1 | 1/2015 | Jaker et al. |
| 2020/0108548 | A1 | 4/2020 | Frances et al. |

FOREIGN PATENT DOCUMENTS

WO 2018/206689 A1 11/2018

OTHER PUBLICATIONS

International Search Report received in international application No. PCT/EP2020/087233, mailed Feb. 16, 2021.

* cited by examiner

*Primary Examiner* — Christopher T Schatz
(74) *Attorney, Agent, or Firm* — McBee, Moore & Vanik IP, LLC

(57) ABSTRACT

The invention relates to a method for the additive manufacturing of a silicone elastomer article using a 3D printer. The invention also relates to a crosslinkable silicone composition for the additive manufacturing of a silicone elastomer article.

6 Claims, No Drawings

METHOD FOR THE ADDITIVE MANUFACTURING OF A SILICONE ELASTOMER ARTICLE

CROSS-REFERENCE TO RELATED APPLICATIONS

This application is the National Stage entry of International Application No. PCT/EP2020/087233, filed 18 Dec. 2020, which claims priority to European Patent Application No. 19306746.9 filed 20 Dec. 2019.

BACKGROUND

Technical Field

The invention relates to a method for the additive manufacturing of a silicone elastomer article using a 3D printer. The invention also relates to a crosslinkable silicone composition for the additive manufacturing of a silicone elastomer article.

Description of Related Art

Additive manufacturing techniques cover different technologies whose common feature is an automative additive buildup of layers of the shaped parts. Crosslinking silicone compositions have already been used in additive manufacturing methods to produce a three dimensional elastomer silicone article or part.

However, it is sometimes complicated to print silicone elastomer articles having a complex shape, like a height of at least 5 cm, overhanging structures or cavities. Different approaches have been used to print these types of articles. The document US2015/0028523 discloses a method for printing a 3D part with an additive manufacturing system using a support material comprising a polyglycolic acid polymer. However, it is necessary to heat the support material at a very high temperature (more than 150° C.) to print it.

The document WO2018/206689 discloses a silicone composition comprising a thixotropic agent, which can be used in 3D printing. However, the use of thixotropic agent can sometimes results in loss of reactivity, as it can interact with the catalyst. Therefore, the crosslinking rate can be slowed down.

As these techniques still have some drawbacks, there is a need to provide an improved method to 3D print silicone elastomer articles.

Consequently, an essential objective of the present invention is to provide a method for the additive manufacturing of a silicone elastomer article.

Another essential objective of the present invention is to provide a method for the additive manufacturing of a silicone elastomer article, where the method is easy to implement.

Another essential objective of the present invention is to provide a silicone composition which can be used in a method for the additive manufacturing of a silicone elastomer article.

Another essential objective of the present invention is to provide a silicone composition which has good reactivity.

SUMMARY

These objectives, among others, are achieved by the present invention which relates first to a method for the additive manufacturing of a silicone elastomer article using a 3D printer, selected from an extrusion 3D printer and a 3D jetting printer, said method comprising the steps of:

1) printing a crosslinkable silicone composition X on a substrate, to form a first layer;
2) printing the crosslinkable silicone composition X on the first or previous layer, to form a subsequent layer;
3) optionally repeating step 2); and
4) allowing the first and subsequent layers to crosslink, optionally by heating, to obtain a silicone elastomer article;

characterized in that the crosslinkable silicone composition X comprises:

(A) at least one organopolysiloxane compound A comprising, per molecule, at least two C2-C6 alkenyl radicals bonded to silicon atoms;
(B) at least one organohydrogenopolysiloxane compound B comprising, per molecule, at least two hydrogen atoms bonded to an identical or different silicon atom;
(C) at least one catalyst C comprising at least one metal or compound, from the platinum group;
(D) at least one thixotropic agent D selected from organosilicon compounds containing, per molecule, at least one cyclic amine functional group;
(E) at least one filler E; and
(F) optionally at least one crosslinking inhibitor F;

said crosslinkable silicone composition X having a nitrogen content between 0.003 and 0.02 wt. %, preferably between 0.004 and 0.017 wt. %, and more preferably between 0.0045 and 0.016 wt. %.

DETAILED DESCRIPTION OF A PREFERRED EMBODIMENT

The invention also relates to a silicone elastomer article obtained by the method described herein.

The invention also relates to a crosslinkable silicone composition X comprising:

(A) at least one organopolysiloxane compound A comprising, per molecule, at least two C2-C6 alkenyl radicals bonded to silicon atoms;
(B) at least one organohydrogenopolysiloxane compound B comprising, per molecule, at least two hydrogen atoms bonded to an identical or different silicon atom;
(C) at least one catalyst C comprising at least one metal or compound, from the platinum group;
(D) at least one thixotropic agent D selected from organosilicon compounds containing, per molecule, at least one cyclic amine functional group;
(E) at least one filler E; and
(F) optionally at least one crosslinking inhibitor F;

said crosslinkable silicone composition X having a nitrogen content between 0.003 and 0.02 wt. %, preferably between 0.004 and 0.017 wt. %, and more preferably between 0.0045 and 0.016 wt. %.

The invention also relates to a silicone elastomer article obtained by crosslinking of the crosslinkable silicone composition X.

The invention also relates to the use of a crosslinkable silicone composition X for the additive manufacturing of a silicone elastomer article, using a 3D printer, selected from an extrusion 3D printer and a 3D jetting printer.

The invention also relates to an organopolysiloxane of formula (D7):

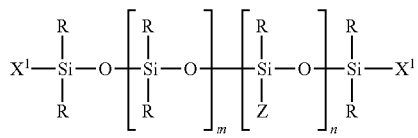
(D7)

Wherein:

the R symbols are identical or different and represent a monovalent hydrocarbon radical selected from the group consisting of a linear or branched alkyl radical having from 1 to 6 carbon atoms, a phenyl radical and a 3,3,3-trifluoropropyl radical;

the $X^1$ symbols are identical or different and represent alkenyl radical having 2 to 6 carbon atoms;

Z represents a group having sterically hindered piperidinyl group(s) of formula (I):

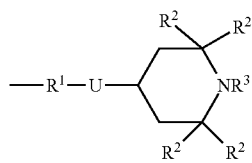
(I)

wherein:

- $R^1$ is a linear or branched alkylene radical having from 2 to 18 carbon atoms; an alkylenecarbonyl radical whose linear or branched alkylene part has 2 to 20 carbon atoms; an alkylenecyclohexylene radical, whose linear or branched alkylene part has from 2 to 12 carbon atoms and the cyclohexylene part has an —OH group and, optionally, 1 or 2 alkyl radicals having from 1 to 4 carbon atoms; a radical of formula —$R^4$—O—$R^5$— wherein the $R^4$ and $R^5$ radicals, identical or different, represent alkylene radicals having 1 to 12 carbon atoms; a radical of formula —$R^4$—O—$R^5$— wherein the $R^4$ and $R^5$ radicals have the meanings indicated above and one or both of them are substituted by one or two OH group(s); a radical of formulae —$R^4$—COO—$R^5$— and —$R^4$—OCO—$R^5$— wherein $R^4$ and $R^5$ have the above meanings; or a radical of formula —$R^6$—O—$R^7$—O—CO—$R^8$— wherein $R^6$, $R^7$ and $R^8$, identical or different, represent alkylene radicals having from 2 to 12 carbon atoms and the $R^7$ radical is optionally substituted by a hydroxyl group;

- U can be present or absent, and, if present, U represents —O— or —$NR^9$—, $R^9$ being a hydrogen atom; a linear or branched alkyl radical having from 1 to 6 carbon atoms; a divalent radical —$R^1$— which has the meaning indicated above, one of the valency bonds being connected to the nitrogen atom of —$NR^9$— and the other being connected to a silicon atom; or a divalent radical of formula:

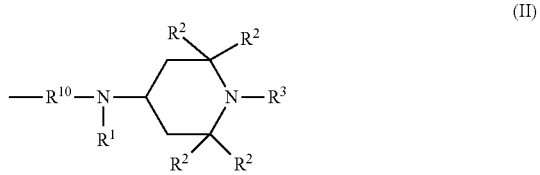
(II)

wherein $R^1$ has the meaning indicated above, $R^2$ and $R^3$ have the meanings indicated below and $R^{10}$ represents a linear or branched alkylene radical having 1 to 12 carbon atoms, one of the valency bonds (that of $R^{10}$) being connected to the nitrogen atom of —$NR^9$— and the other (that of $R^1$) being connected to a silicon atom; $R^2$ identical or different are from linear or branched alkyl radicals having from 1 to 3 carbon atoms or a phenyl radical; $R^3$ represents a hydrogen atom or the $R^2$ radical;

m is between 0 and 2,000, preferably between 0 and 1,500, and n is between 1 and 50, preferably between 1 and 20.

DETAILED DESCRIPTION

In the present disclosure, the symbol "wt. %" refers to a percentage by weight, and ppm refers to parts-per-million.

Method of Additive Manufacturing

The invention first relates to a method for the additive manufacturing of a silicone elastomer article using a 3D printer, selected from an extrusion 3D printer and a 3D jetting printer, said method comprising the steps of:

1) printing a crosslinkable silicone composition X on a substrate, to form a first layer;
2) printing the crosslinkable silicone composition X on the first or previous layer, to form a subsequent layer
3) optionally repeating step 2); and
4) allowing the first and subsequent layers to crosslink, optionally by heating, to obtain a silicone elastomer article.

3D printing is generally associated with a host of related technologies used to fabricate physical objects from computer generated, e.g. computer-aided design (CAD), data sources.

This disclosure generally incorporates ASTM Designation F2792—12a, "Standard Terminology for Additive Manufacturing Technologies".

"3D printer" is defined as "a machine used for 3D printing" and "3D printing" is defined as "the fabrication of objects through the deposition of a material using a print head, nozzle, or another printer technology."

"Additive manufacturing (AM)" is defined as "a process of joining materials to make objects from 3D model data, usually layer upon layer, as opposed to subtractive manufacturing methodologies. Synonyms associated with and encompassed by 3D printing include additive fabrication, additive processes, additive techniques, additive layer manufacturing, layer manufacturing, and freeform fabrication." Additive manufacturing (AM) may also be referred to as rapid prototyping (RP). As used herein, "3D printing" is generally interchangeable with "additive manufacturing" and vice versa.

"Printing" is defined as depositing of a material, here a crosslinkable silicone composition, using a print head, nozzle, or another printer technology.

In this disclosure "3D or three dimensional article, object or part" means an article, object or part obtained by additive manufacturing or 3D printing as disclosed above.

In the first step, the layer of the crosslinkable silicone composition X is printed on a substrate such that the layer is formed on the substrate. The substrate is not limited and may be any substrate. The substrate can support the 3D article during its method of manufacturing as for example the substrate plate of the 3D printer. The substrate can be rigid or flexible and can be continuous or discontinuous. The substrate may itself be supported, for example by a substrate table or plate, such that the substrate needs not to have rigidity. It may also be removable from the 3D article. Alternatively, the substrate can be physically or chemically bond to the 3D article. In one embodiment, the substrate may be in silicone.

The layer formed by printing the crosslinkable silicone composition X may have any shape and any dimension. The layer can be continuous or discontinuous.

In the second step, a subsequent layer is formed by printing the crosslinkable silicone composition X on the previous layer, formed in the first step, with an extrusion 3D printer or a material 3D jetting printer. The extrusion 3D printer and the material 3D jetting printer may be the same as or different from the extrusion 3D printer or a material 3D jetting printer utilized in step 1).

The subsequent layer formed by printing the crosslinkable silicone composition X may have any shape and any dimension. The subsequent layer can be continuous or discontinuous.

In the third step, the second step is repeated to obtain as many layers as needed. Advantageously, the number of layers is comprised between 10 and 1,000, preferably between 20 and 500.

In the fourth step, by allowing the layers to complete crosslinking, optionally by heating, a silicone elastomer article is obtained. Crosslinking can be completed at ambient temperature. Usually ambient temperature refers to a temperature between 20 and 25° C.

Heating may be used to accelerate the crosslinking or curing of the layers. A thermal cure after printing can be done at a temperature between 50 and 200° C., preferably between 60 and 100° C., in order to achieve complete cure or crosslinking faster without collapse of the structure.

In this document the term "layer" may relate to the layers at any stage of the method, first or previous or subsequent layer. The layers can be each of various dimensions, including thickness and width. Thickness of the layers can be uniform or may vary. Average thickness is related to the thickness of the layer immediately after printing.

In an embodiment, the layers independently have a thickness of from 50 to 2000 µm, preferably from 100 to 800 micrometers and more preferably from 100 to 600 micrometers.

In a particular embodiment, no energy source as heat or radiation is applied during or between steps 1) to 3) prior to the printing of at least 10, preferably 20 layers.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however other file formats can also or additionally be used. The file is generally read into 3D printing software, which takes the file and optionally user input to separate it into hundreds, thousands, or even millions of "slices." The 3D printing software typically outputs machine instructions, which may be in the form of G-code, which is read by the 3D printer to build each slice of the precursor of the silicone elastomer article. The machine instructions are transferred to the 3D printer, which then builds the object (precursor of the silicone elastomer article), layer by layer, based on this slice information in the form of machine instructions. Thicknesses of these slices may vary.

Typically, the 3D printer utilizes a dispenser, e.g. a nozzle or print head, for printing the crosslinkable silicone composition X. Optionally, the dispensers may be heated before, during, and after dispensing the crosslinkable silicone composition X. More than one dispenser may be utilized with each dispenser having independently selected properties.

An extrusion 3D printer is a 3D printer where the material is extruded through a nozzle, syringe or orifice during the additive manufacturing process. The 3D printer can have one or more nozzle, syringe or orifice.

Material extrusion generally works by extruding material through a nozzle, syringe or orifice to print one cross-section of an object, which may be repeated for each subsequent layer. The extruded material bonds to the layer below it during cure of the material.

Advantageously, the crosslinkable silicone composition X is extruded through a nozzle. The nozzle may be heated to aid in dispensing the crosslinkable silicone composition X.

The average diameter of the nozzle defines the thickness of the layer. In an embodiment, the diameter of the nozzle is comprised from 50 to 2,000 µm, preferably from 100 to 1,000 µm and most preferably from 100 to 500 µm.

The distance between the nozzle and the substrate is an important parameter to assure good shape. Preferably it is comprised from 50 to 200%, more preferably from 80 to 120% of the nozzle average diameter.

The crosslinkable silicone composition X to be dispensed through the nozzle may be supplied from cartridge-like systems. The cartridges may include a nozzle or nozzles with an associated fluid reservoir or fluids reservoirs. It is also possible to use a coaxial two cartridges system with a static mixer and only one nozzle. This is especially useful when the crosslinkable silicone composition X is a multi-part composition.

Pressure will be adapted to the fluid to be dispensed, the associated nozzle average diameter and the printing speed.

Because of the high shear rate occurring during the nozzle extrusion, the viscosity of the crosslinkable silicone composition X is greatly lowered and so permits the printing of fine layers.

Cartridge pressure could vary from 1 to 28 bars, preferably from 2 to 25 bars and most preferably from 4 to 8 bars. When nozzle diameters lower than 100 µm are used, cartridge pressure shall be higher than 20 bars to get good material extrusion. An adapted equipment using aluminum cartridges shall be used to resist such a pressure.

The nozzle and/or build platform moves in the X-Y (horizontal plane) to complete the cross section of the object, before moving in the Z axis (vertical) plane once one layer is complete. The nozzle has a high XYZ movement precision around 10 µm. After each layer is printed in the X, Y work plane, the nozzle is displaced in the Z direction only far enough that the next layer can be applied in the X, Y work place. In this way, the object which becomes the precursor of the silicone elastomer article can be built one layer at a time from the bottom upwards.

As disclosed before, the distance between the nozzle and the previous layer is an important parameter to assure good shape. Preferably, it should be comprised from 70 to 200%, preferably from 80 to 120% of the nozzle average diameter.

Advantageously, printing speed is comprised between 1 and 100 mm/s, preferably between 3 and 50 mm/s to obtain the best compromise between good accuracy and manufacture speed.

"Material jetting" is defined as "an additive manufacturing process in which droplets of build material are selectively deposited". The material is applied with the aid of a printing head in the form of individual droplets, discontinuously, at the desired location of the work plane (Jetting). 3D apparatus and a process for the step-by-step production of 3D structures with a printing head arrangement comprising at least one, preferably 2 to 200 printing head nozzles, allowing the site-selective application where appropriate of a plurality of materials. The application of the materials by means of inkjet printing imposes specific requirements on the viscosity of the materials.

In a 3D jetting printer one or a plurality of reservoirs are subject to pressure and being connected via a metering line to a metering nozzle. Upstream or downstream of the reservoir there may be devices which make it possible for multicomponent silicone compositions to be homogeneously mixed and/or to evacuate dissolved gases. One or a plurality of jetting apparatuses operating independently of one another may be present, to construct the precursor of the silicone elastomer article from different silicone compositions, or, in the case of more complex structures, to permit composite parts made from silicone elastomers and other plastics.

Because of the high shear rate occurring in the metering valve during the jetting metering procedure, the viscosity of such silicone compositions is greatly lowered and so permits the jetting metering of very fine microdroplets. After the microdrop has been deposited on the substrate, there is a sudden reduction in its shear rate, and so its viscosity climbs again. Because of this, the deposited drop rapidly becomes of high viscosity again and permits the shape-precise construction of three-dimensional structures.

The individual metering nozzles can be positioned accurately in x-, y-, and z-directions to permit precisely targeted deposition of the crosslinkable silicone composition drops on the substrate or, in the subsequent course of formation of shaped parts, on the precursor of the silicone elastomer article, which has already been placed.

In a preferred embodiment of the method, the method for additive manufacturing a three-dimensional silicone elastomer article uses an extrusion 3D printer.

In an embodiment of the method, the method for additive manufacturing a three-dimensional silicone elastomer article uses an extrusion 3D printer comprising at least a nozzle for printing the crosslinkable silicone composition X, the diameter of each nozzle being comprised from 50 to 2,000 μm, preferably from 100 to 800 μm and most preferably from 100 to 500 μm.

The crosslinking step 4) can be performed at room temperature or by heating. Advantageously, the crosslinking step 4) is performed at room temperature or by heating at a temperature between 50 and 200° C., preferably between 60 and 100° C., and preferably for a period from 10 min to 24 hours.

This crosslinking step can be performed several times. In an embodiment, step 4) is a step of heating the crosslinkable silicone composition X. Heating can be used to expedite cure. In an embodiment, step 4) is a step of irradiating the crosslinkable silicone composition X, the irradiation can be performed with UV light or infrared radiation (IR). Further irradiation can be used to expedite cure. In another embodiment, step 4) comprises both heating and irradiating the crosslinkable silicone composition X.

It is well known that it is possible to use a support material for the additive manufacturing of silicone elastomers, this is for example disclosed in US2015/0028523.

Post-Process Options Optionally, post-processing steps can greatly improve the surface quality of the printed articles. Sanding is a common way to reduce or remove the visibly distinct layers of the model. Spraying or coating the surface of the silicone elastomer article with a heat or UV curable RTV or LSR crosslinkable silicone composition can be used to get the right smooth surface aspect.

A surfacing treatment with a laser can also be done.

For medical applications, a sterilization of the final elastomer article can be obtained for example: by heating either in a dry atmosphere or in an autoclave with vapor, for example by heating the object at a temperature greater than 100° C., under gamma ray, sterilization with ethylene oxide, sterilization with an electron beam.

The obtained silicone elastomer article can be any article with simple or complex geometry. It can be for example anatomic models (functional or non functional) such as heart, limb, kidney, prostate . . . , models for surgeons and educative world or orthotics or prostheses or even implants of different classes such as long term implants: hearing aids, stents, larynx implants, etc.

The obtained silicone elastomer article can also be an actuator for robotics, a gasket, a mechanical piece for automotive/aeronautics, a piece for electronic devices, a package for the encapsulation of components, a vibrational isolator, an impact isolator or a noise isolator.

Crosslinkable Silicone Composition X

The crosslinkable silicone composition X precursor of a silicone elastomer is a silicone composition crosslinkable via polyaddition reaction.

The crosslinkable silicone composition X comprises:
(A) at least one organopolysiloxane compound A comprising, per molecule, at least two C2-C6 alkenyl radicals bonded to silicon atoms;
(B) at least one organohydrogenopolysiloxane compound B comprising, per molecule, at least two hydrogen atoms bonded to an identical or different silicon atom;
(C) at least one catalyst C comprising at least one metal or compound, from the platinum group;
(D) at least one thixotropic agent D selected from organosilicon compounds containing, per molecule, at least one cyclic amine functional group;
(E) at least one filler E; and
(F) optionally at least one crosslinking inhibitor F.

The crosslinkable silicone composition X is a crosslinkable silicone composition having preferably a viscosity comprised between 1,300 and 10,000 Pa·s, preferably between 2,000 and 6,000 Pa·s. The viscosities of the silicone composition X correspond to viscosities measured with a rheometer, at 25° C., with a cone-plate of 2° and a rotational shear rate of 0.5 s$^{-1}$.

The crosslinkable silicone composition X has a nitrogen content between 0.003 and 0.02 wt. %, preferably between 0.004 and 0.017 wt. %, and more preferably between 0.0045 and 0.016 wt. %. The nitrogen content is expressed in % by weight of elemental nitrogen in the crosslinkable silicone composition X. The nitrogen content of the crosslinkable silicone composition X can also be expressed in ppm. In this case, the silicone composition X has a nitrogen content between 30 ppm and 200 ppm, preferably between 40 ppm and 170 ppm, and more preferably between 45 ppm and 160 ppm. In a specific embodiment, the nitrogen content is based solely on the elemental nitrogen of thixotropic agent D comprising a cyclic amine functional group.

In a specific embodiment, the crosslinkable silicone composition X has a yield stress between 400 and 3,000 Pa, preferably between 450 and 2,500 Pa, and more preferably between 500 and 2,250 Pa. The yield stress is the stress at which the crosslinkable silicone composition X begins to flow. The yield stress can be determined using the Herschel-Bulkley model. The yield stress of the crosslinkable silicone composition X is determined by rotational shear measurement, at 25° C., using a rheometer with a cone plate geometry of 20 mm and a cone angle of 2°. The rotational shear measurement is carried out as follows: 120 s to go from 0 to 20 s$^{-1}$, and 120 s to go from 20 to 0 s$^{-1}$. Then, the measured stress is plotted in function of the shear stress applied. The linear part of the obtained curve from 20 to 0 s$^{-1}$ is then used to determine the yield stress (approximately from 20 to 2.5 s$^{-1}$). A linear regression is performed on this linear part of the curve to determine the yield stress, which corresponds to the intercept.

The crosslinkable silicone composition X can be used for printing a silicone elastomer article. The specific nitrogen content allows the composition to have adequate rheological properties and a good reactivity. In particular, the crosslinkable silicone composition X has good printability and can be put into cartridges. Moreover, little loss of reactivity is observed with this composition. The silicone elastomer article obtained by this method has also good mechanical properties.

Organopolysiloxane A

According to a particularly advantageous mode, the organopolysiloxane A comprising, per molecule, at least two $C_2$-$C_6$ alkenyl radicals bonded to silicon atoms, comprises:
(i) at least two siloxyl units (A.1), which may be identical or different, having the following formula:

$$W_a Z_b SiO_{\frac{4-(a+b)}{2}} \quad (A.1)$$

in which:
a=1 or 2, b=0, 1 or 2 and a+b=1, 2 or 3;
the symbols W, which may be identical or different, represent a linear or branched $C_2$-$C_6$ alkenyl group,
and the symbols Z, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals,
(ii) and optionally at least one siloxyl unit having the following formula:

$$Z^1_a SiO_{\frac{4-a}{2}} \quad (A.2)$$

in which:
a=0, 1, 2 or 3,
the symbols $Z^1$, which may be identical or different, represent a monovalent hydrocarbon-based group containing from 1 to 30 carbon atoms, preferably chosen from the group formed by alkyl groups containing from 1 to 8 carbon atoms inclusive and aryl groups containing between 6 and 12 carbon atoms, and even more preferentially chosen from the group formed by methyl, ethyl, propyl, 3,3,3-trifluoropropyl, xylyl, tolyl and phenyl radicals.

Advantageously, Z and $Z^1$ are chosen from the group formed by methyl and phenyl radicals, and W is chosen from the following list: vinyl, propenyl, 3-butenyl, 5-hexenyl, 9-decenyl, 10-undecenyl, 5,9-decadienyl and 6-11-dodecadienyl, and preferably, W is a vinyl.

In a preferred embodiment, in formula (A.1) a=1 and a+b=2 or 3 and in formula (A.2) a=2 or 3.

These organopolysiloxanes A may have a linear, branched or cyclic structure. Their degree of polymerization is preferably between 2 and 5,000.

When they are linear polymers, they are essentially formed from siloxyl units D chosen from the group formed by the siloxyl units $W_2SiO_{2/2}$, $WZSiO_{2/2}$ and $Z^1{}_2SiO_{2/2}$, and from siloxyl units M chosen from the group formed by the siloxyl units $W_3SiO_{1/2}$, $WZ_2SiO_{1/2}$, $W_2ZSiO_{1/2}$ and $Z^1{}_3SiO_{1/2}$. The symbols W, Z and $Z^1$ are as described above.

As examples of end units M, mention may be made of trimethylsiloxy, dimethylphenylsiloxy, dimethylvinylsiloxy or dimethylhexenylsiloxy groups.

As examples of units D, mention may be made of dimethylsiloxy, methylphenylsiloxy, methylvinylsiloxy, methylbutenylsiloxy, methylhexenylsiloxy, methyldecenylsiloxy or methyldecadienylsiloxy groups.

Said organopolysiloxanes A may be oils or gums with a dynamic viscosity from about 10 to 10,000,000 mPa·s at 25° C., generally from about 1,000 to 120,000 mPa·s at 25° C.

When they are cyclic organopolysiloxanes, they are formed from siloxyl units D having the following formulae: $W_2SiO_{2/2}$, $Z_2SiO_{2/2}$ or $WZSiO_{2/2}$, which may be of the dialkylsiloxy, alkylarylsiloxy, alkylvinylsiloxy or alkylsiloxy type. Examples of such siloxyl units have already been mentioned above. Said cyclic organopolysiloxanes A have a viscosity from about 10 to 5,000 mPa·s at 25° C.

Preferably, the organopolysiloxane compound A has a mass content of Si-vinyl units of between 0.001 and 30%, preferably between 0.01 and 10%.

Organohydrogenopolysiloxane B

The organohydrogenopolysiloxane compound B is an organopolysiloxane containing at least two hydrogen atoms per molecule, bonded to an identical or different silicon atom, and preferably containing at least three hydrogen atoms per molecule directly bonded to an identical or different silicon atom.

Advantageously, the organohydrogenopolysiloxane compound B is an organopolysiloxane comprising:
(i) at least two siloxyl units and preferably at least three siloxyl units having the following formula:

$$H_d Z^3_e SiO_{\frac{4-(d+e)}{2}} \quad (B.1)$$

in which:
d=1 or 2, e=0, 1 or 2 and d+e=1, 2 or 3,
the symbols $Z^3$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals, and (ii) optionally at least one siloxyl unit having the following formula:

(B.2)

in which:

c=0, 1, 2 or 3, the symbols $Z^2$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals.

The organohydrogenopolysiloxane compound B may be formed solely from siloxyl units of formula (B.1) or may also comprise units of formula (B.2). It may have a linear, branched or cyclic structure. The degree of polymerization is preferably greater than or equal to 2.

More generally, it is less than 5,000.

Examples of siloxyl units of formula (B.1) are especially the following units: $H(CH_3)_2SiO_{1/2}$, $H(CH_3)SiO_{2/2}$ and $H(C_6H_5)SiO_{2/2}$.

When they are linear polymers, they are essentially formed from:

siloxyl units D chosen from the units having the following formulae $Z^2{}_2SiO_{2/2}$ or $Z^3HSiO_{2/2}$, and siloxyl units M chosen from the units having the following formulae $Z^2{}_3SiO_{1/2}$ or $Z^3{}_2HSiO_{1/2}$, the symbols $Z^2$ and $Z^3$ are as described above.

These linear organopolysiloxanes may be oils with a dynamic viscosity from about 1 to 100,000 mPa·s at 25° C., generally from about 10 to 5,000 mPa·s at 25° C., or gums with a dynamic viscosity of about 1,000,000 mPa·s or more at 25° C.

When they are cyclic organopolysiloxanes, they are formed from siloxyl units D having the following formulae $Z^2{}_2SiO_{2/2}$ and $Z^3HSiO_{2/2}$, which may be of the dialkylsiloxy or alkylarylsiloxy type or units $Z^3HSiO_{2/2}$ solely, the symbols $Z^2$ and $Z^3$ are as described above.

They have a viscosity from about 1 to 5,000 mPa·s.

Examples of linear organohydrogenopolysiloxane compounds B are: dimethylpolysiloxanes bearing hydrogenodimethylsilyl end groups, dimethyl, hydrogenomethylpolysiloxanes bearing trimethylsilyl end groups, dimethyl, hydrogenomethylpolysiloxanes bearing hydrogenodimethylsilyl end groups, hydrogenomethylpolysiloxanes bearing trimethylsilyl end groups, and cyclic hydrogenomethylpolysiloxanes.

The oligomers and polymers corresponding to the general formula (B.3) are especially preferred as organohydrogenopolysiloxane compound B:

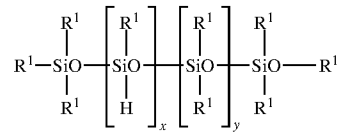

(B.3)

in which:

x and y are an integer ranging between 0 and 200, the symbols $R^1$, which may be identical or different, represent, independently of each other:

a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl, a cycloalkyl radical containing between 5 and 8 cyclic carbon atoms, an aryl radical containing between 6 and 12 carbon atoms, or an aralkyl radical bearing an alkyl part containing between 5 and 14 carbon atoms and an aryl part containing between 6 and 12 carbon atoms.

The following compounds are particularly suitable for the invention as organohydrogenopolysiloxane compound B:

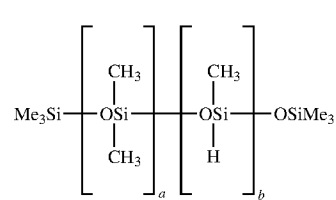

S1

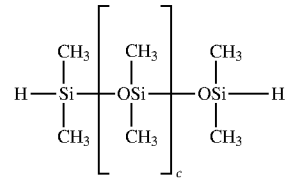

S2

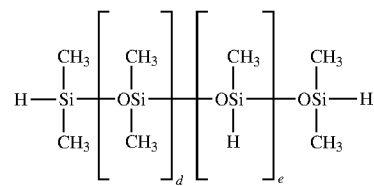

S3 with a, b, c, d and e defined below:

in the polymer of formula S1:
$0 \leq a \leq 150$, preferably $0 \leq a \leq 100$, and more particularly $0 \leq a \leq 20$, and
$1 \leq b \leq 90$, preferably $10 \leq b \leq 80$ and more particularly $30 \leq b \leq 70$, in the polymer of formula S2: $0 \leq c \leq 100$, preferably $0 \leq c \leq 15$ in the polymer of formula S3: $5 \leq d \leq 200$, preferably $20 \leq d \leq 100$, and $2 \leq e \leq 90$, preferably $10 \leq e \leq 70$.

In particular, an organohydrogenopolysiloxane compound B that is suitable for use in the invention is the compound of formula S1, in which a=0.

Preferably, the organohydrogenopolysiloxane compound B has a mass content of SiH units of between 0.2 and 91%, preferably between 0.2 and 50%.

In an embodiment, the organohydrogenopolysiloxane compound B is a branched polymer. Said branched organohydrogenopolysiloxane compound B comprises
a) at least two different siloxyl units selected from siloxyl unit M of formula $R_3SiO_{1/2}$, siloxyl unit D of formula $R_2SiO_{2/2}$, siloxyl unit T of formula $RSiO_{3/2}$ and siloxyl unit Q of formula $SiO_{4/2}$, in which R denotes monovalent hydrocarbon group with 1 to 20 carbon atoms or an hydrogen atom, and
b) provided that at least one of these siloxyl units is siloxyl unit T or Q and at least one of siloxyl units M, D or T contains a Si—H group.

Thus, according to one preferable embodiment, the branched organohydrogenopolysiloxane compound B can be selected from the following groups:
organopolysiloxane resin of formula M'Q, which is essentially formed from:
(a) monovalent siloxyl unit M' of formula $R_2HSiO_{1/2}$; and
(b) tetravalent siloxyl unit Q of formula $SiO_{4/2}$; and
organopolysiloxane resin of formula MD'Q, which is basically consisted of the following units:
(a) divalent siloxyl unit D' of formula $RHSiO_{2/2}$;
(b) monovalent siloxyl unit M of formula $R_3SiO_{1/2}$; and
(c) tetravalent siloxyl unit Q of formula $SiO_{4/2}$;
wherein R represents monovalent hydrocarbyl having 1 to 20 carbon atoms, preferably represents monovalent aliphatic or aromatic hydrocarbyl having 1 to 12, more preferably 1 to 8 carbon atoms.

As a further embodiment, a mixture of at least a linear organohydrogenopolysiloxane compound B and at least a branched organohydrogenopolysiloxane compound B can be used. In this case, the linear and branched organohydrogenopolysiloxane compound B can be mixed in any proportion in a wide range, and the mixing proportion may be adjusted depending on the desired product properties such as hardness and the ratio of Si—H to alkenyl group.

In the context of the invention, the proportions of the organopolysiloxane A and of the organohydrogenopolysiloxane B are such that the mole ratio of the hydrogen atoms bonded to silicon (Si—H) in the organohydrogenopolysiloxane B to the alkenyl radicals bonded to silicon (Si—CH=CH$_2$) in the organopolysiloxane A can be between 0.2 and 20, preferably between 0.5 and 15, more preferentially between 0.5 and 10 and even more preferentially between 0.5 and 5.

Catalyst C

Catalyst C comprising at least one metal, or compound, from the platinum group are well known. The metals of the platinum group are those known under the name platinoids, this term combining, besides platinum, ruthenium, rhodium, palladium, osmium and iridium. Platinum and rhodium compounds are preferably used. Complexes of platinum and of an organic product described in patents US A U.S. Pat. Nos. 3,159,601, 3,159,602, 3,220,972 and European patents EP A 0 057 459, EP A 0 188 978 and EP A 0 190 530, and complexes of platinum and of vinylorganosiloxanes described in patents US A U.S. Pat. Nos. 3,419,593, 3,715, 334, 3,377,432 and US A U.S. Pat. No. 3,814,730 may be used in particular. Specific examples are: platinum metal powder, chloroplatinic acid, a complex of chloroplatinic acid with β-diketone, a complex a chloroplatinic acid with olefin, a complex of a chloroplatinic acid with 1,3-divinyltetramethyldisiloxane, a complex of silicone resin powder that contains aforementioned catalysts, a rhodium compound, such as those expressed by formulae: $RhCl(Ph_3P)_3$, $RhCl_3[S(C_4H_9)_2]_3$, etc.; tetrakis(triphenyl)palladium, a mixture of palladium black and triphenylphosphine, etc.

The platinum catalyst ought preferably to be used in a catalytically sufficient amount, to allow sufficiently rapid crosslinking at room temperature. Typically, 1 to 200 ppm by weight of the catalyst are used, based in the amount of Pt metal, relative to the total silicone composition preferably 1 to 100 ppm by weight, more preferably 1 to 50 ppm by weight.

Thixotropic Agent D

The crosslinkable silicone composition X also comprises a thixotropic agent D, which is a rheological agent which serves to adjust the shear-thinning and thixotropic characteristics. In particular, the thixotropic agent D allows the crosslinkable silicone composition X to have a viscosity which can be adjusted according to the applied stress. When stress is applied to the composition, the viscosity is lowered, so that printing can be done, and when the stress is stopped, the viscosity comes back to its initial value.

The thixotropic agent D is selected from organosilicon compounds containing, per molecule, at least one cyclic amine functional group. The cyclic amine functional group of the thixotropic agent D can be a piperidinyl functional group.

In a specific embodiment, the thixotropic agent D is an organopolysiloxane having, per mole, at least one unit of general formula:

$$(R)_a(X)_bZSiO_{(3-(a+b))/2} \tag{D1}$$

wherein:
the R symbols are identical or different and represent a monovalent hydrocarbon radical selected from the group consisting of a linear or branched alkyl radical having from 1 to 6 carbon atoms, a phenyl radical and a 3,3,3-trifluoropropyl radical;
the X symbols are identical or different and represent a monovalent radical selected from the group consisting of a hydroxyl group, an alkenyl radical having 2 to 6 carbon atoms, and an alkoxy radical having from 1 to 6 carbon atoms;
Z represents a group having sterically hindered piperidinyl group(s) of formula (I):

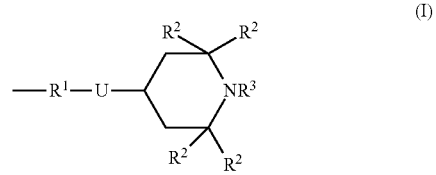

wherein:
$R^1$ is a linear or branched alkylene radical having from 2 to 18 carbon atoms; an alkylenecarbonyl radical whose linear or branched alkylene part has 2 to 20 carbon atoms; an alkylenecyclohexylene radical, whose linear or branched alkylene part has from 2 to 12 carbon atoms and the cyclohexylene part has an —OH group and, optionally, 1 or 2 alkyl radicals having from 1 to 4 carbon atoms; a radical of formula —$R^4$—O—$R^5$— wherein the $R^4$ and $R^5$ radicals, identical or different, represent alkylene radicals having 1 to 12 carbon atoms; a radical of formula —$R^4$—O—$R^5$— wherein the $R^4$ and $R^5$ radicals have the meanings indicated above and one or both of them are substituted by one or two OH group(s); a radical of formulae —$R^4$—COO—$R^5$— and —$R^4$—OCO—$R^5$— wherein $R^4$ and $R^5$ have the above meanings; or a radical of formula —$R^6$—O—$R^7$—O—CO—$R^8$— wherein $R^6$, $R^7$ and $R^8$, identical or different, represent alkylene radicals having from 2 to 12 carbon atoms and the $R^7$ radical is optionally substituted by a hydroxyl group;

U can be present or absent, and, if present, U represents —O— or —NR$^9$—, R$^9$ being a hydrogen atom; a linear or branched alkyl radical having from 1 to 6 carbon atoms; a divalent radical —R$^1$— which has the meaning indicated above, one of the valency bonds being connected to the nitrogen atom of —NR$^9$— and the other being connected to a silicon atom; or a divalent radical of formula:

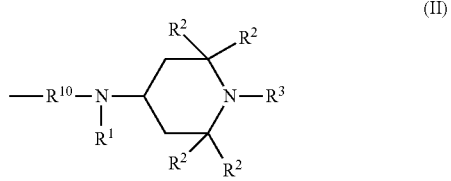
(II)

wherein R$^1$ has the meaning indicated above, R$^2$ and R$^3$ have the meanings indicated below and R$^{10}$ represents a linear or branched alkylene radical having 1 to 12 carbon atoms, one of the valency bonds (that of R$^{10}$) being connected to the nitrogen atom of —NR$^9$— and the other (that of R$^1$) being connected to a silicon atom; R$^2$ identical or different are from linear or branched alkyl radicals having from 1 to 3 carbon atoms or a phenyl radical; R$^3$ represents a hydrogen atom or the R$^2$ radical;

a is a number chosen from 0, 1 and 2;
b is a number chosen from 0, 1 and 2; and
a+b is at most equal to 2.

Preferably, in the groups of formula (I):
R$^1$ is a linear or branched alkylene radical having from 2 to 18 carbon atoms, preferably 2 to 6 carbon atoms;
U represents —O—;
R$^2$ identical or different are from linear or branched alkyl radicals having from 1 to 3 carbon atoms; and
R$^3$ represents a hydrogen atom.

The thixotropic agent D can further comprises other siloxyl unit(s) of formula:

(D2)

wherein:
R and X have the same meanings as those given with respect to the formula (D1);
e is a number chosen from 0, 1, 2 and 3;
f is a number chosen from 0, 1, 2 and 3; and
e+f is at most equal to 3.

In a specific embodiment, the thixotropic agent D further comprises other siloxyl unit(s) of formula:

(D3)

wherein:
R has the same meanings as the one given with respect to the formula (D1);
the X$^1$ symbols are identical or different and represent alkenyl radical having 2 to 6 carbon atoms;
e is a number chosen from 0, 1, and 2;
f is a number chosen from 1, 2 and 3; and
e+f is at most equal to 3.

In a specific embodiment, the thixotropic agent D is a linear organopolysiloxane of general formula:

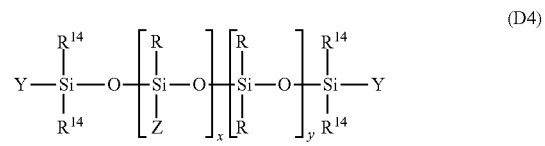
(D4)

wherein:
the R and Z symbols have the meanings given above with respect to the formula (D1);
the Y symbol represents a monovalent radical chosen from the R, Z, and X radicals as defined above with respect to the formula (D1);
the R$^{14}$ symbols are identical or different and represent a monovalent radical chosen from an R radical and an X radical as defined above with respect to the formula (D1); and
x and y are equal to zero or represent integers or fractional numbers of greater than zero, with the further proviso that, if x=0, at least one of the two Y radicals represents the Z radical.

In a specific embodiment, the thixotropic agent D is a cyclic organopolysiloxane of general formula:

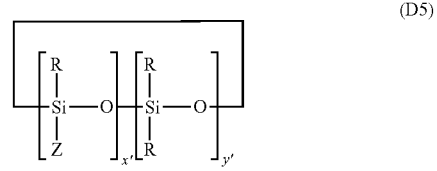
(D5)

wherein:
the R and Z symbols have the meanings given above with respect to the formula (D1);
x' is an integer ≥1; and y' is an integer ≥0, with the proviso that x'+y'≥3.

The thixotropic agent D can correspond to the following formula:

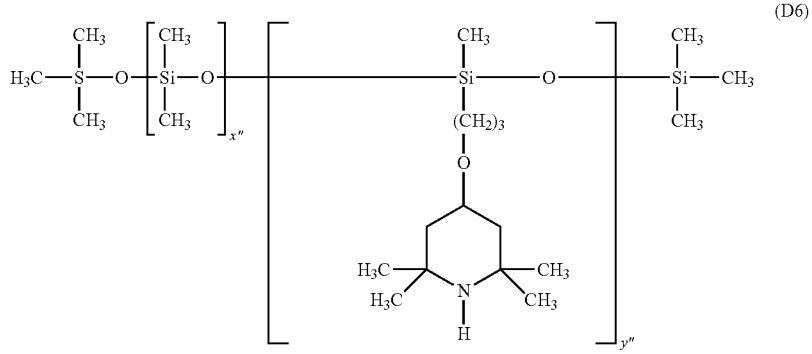
(D6)

wherein:
x" is between 0 and 2,000, preferably between 0 and 1,500, and
y" is between 1 and 50, preferably between 1 and 20.

In a specific embodiment, the thixotropic agent D is a linear organopolysiloxane of general formula:

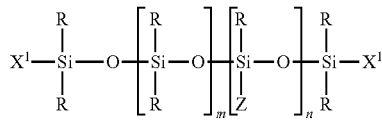
(D7)

wherein:
the R and Z symbols have the meanings given above with respect to the formula (D1),
the $X^1$ symbols has the meanings given above with respect to the formula (D3),
m is between 0 and 2,000, preferably between 1 and 1,700, more preferably between 75 and 1,600, and
n is between 1 and 50, preferably between 1 and 25, more preferably between 2 and 20.

Advantageously, the thixotropic agent D is of formula (D7'):

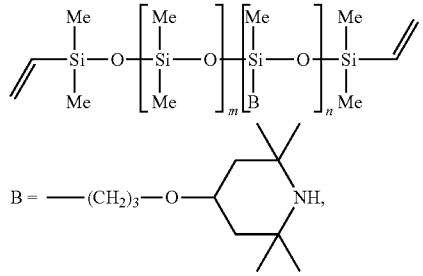
(D7')

wherein
m is between 0 and 2,000, preferably between 1 and 1,700, more preferably between 75 and 1,600, and even more preferably m is 100, and
n is between 1 and 50, preferably between 1 and 25, more preferably between 2 and 20, and even more preferably n is 2.

In an embodiment, the organopolysiloxane is of formula (D7') wherein m is 100 and n is 2.

In another specific embodiment, the thixotropic agent D corresponds to the following formula:

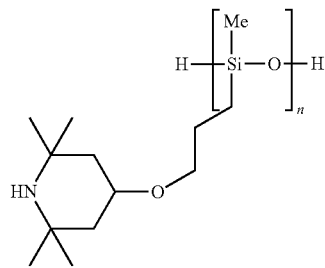
(D8)

wherein n is between 1 and 10.

According to another embodiment, the thixotropic agent D corresponds to the following formula:

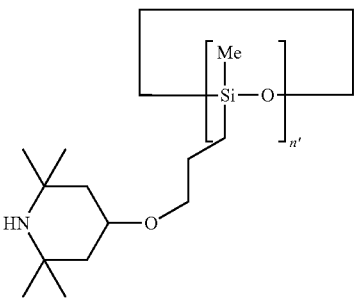
(D9)

wherein n' is between 3 and 10.

The quantity of thixotropic agent D is generally comprised between 0.05 and 3% by weight of the total weight of the crosslinkable silicone composition X, preferably between 0.1 and 2.5% by weight, provided that the nitrogen content in the composition is respected.

The crosslinkable silicone composition X has a nitrogen content between 0.003 and 0.02 wt. %, preferably between 0.004 and 0.017 wt. %, and more preferably between 0.0045 and 0.016 wt. %. In a specific embodiment, the nitrogen content is based solely on the elemental nitrogen of thixotropic agent D comprising a cyclic amine functional group. The specific nitrogen content allows the composition to have adequate rheological properties and a good reactivity. In particular, the crosslinkable silicone composition X has good printability and can be put into cartridges. Moreover, little loss of reactivity is observed with this composition. For example, after 1 month storage, the crosslinking rate can be at least equivalent to 80% of the nominal value measured at time initial at the same temperature. Moreover, the silicone elastomer article obtained by this method has also good mechanical properties.

When the crosslinkable silicone composition X has a nitrogen content which is too high, so higher than 0.02 wt. %, the reactivity of the composition decreases and the crosslinking rate is too low, so the composition cannot be used in 3D printing.

On the contrary, if the nitrogen content of the crosslinkable silicone composition X is too low, so lower than 0.003 wt. %, the composition does not have adequate rheological properties and cannot be used for 3D printing.

Filler E

To allow a sufficiently high mechanical strength, the crosslinkable silicone composition X comprises a filler, such as for example silica fine particles, as reinforcing fillers E. Precipitated and fumed silicas and mixtures thereof can be used. The specific surface area of these actively reinforcing fillers ought to be at least 50 m²/g and preferably in the range from 100 to 400 m²/g as determined by the BET method. Actively reinforcing fillers of this kind are very well-known materials within the field of the silicone rubbers. The stated silica fillers may have hydrophilic character or may have been hydrophobized by known processes. In a preferred embodiment, the silica reinforcing filler is fumed silica with a specific surface area of at least 50 m²/g and preferably in the range from 100 to 400 m²/g as determined by the BET method. Fumed silica may be used as is, in an untreated form, but is preferably subjected to hydrophobic surface treatment. In those cases, where a fumed silica that has undergone hydrophobic surface treatment is used, either a fumed silica that has been subjected to preliminary hydrophobic surface treatment may be used, or a surface treatment agent may be added during mixing of the fumed silica with the organopolysiloxane A, so that the fumed silica is treated in-situ.

The surface treatment agent may be selected from any of the conventionally used agents, such as alkylalkoxysilanes, alkylchlorosilanes, alkylsilazanes, silane coupling agents, titanate-based treatment agents, and fatty acid esters, and may use either a single treatment agent, or a combination of two or more treatment agents, which may be used either simultaneously or at different timings.

The amount of the silica reinforcing filler E in the addition-crosslinking silicone compositions is in the range from 5% to 40% by weight, preferably 10% to 35% by weight of the total weight of the crosslinkable silicone composition X. If this blend quantity is less than 5% by weight, then adequate elastomer strength may not be obtainable, whereas if the blend quantity exceeds 40% by weight, the actual blending process may become difficult.

The silicone compositions according to the invention may also comprise other fillers like a standard semi-reinforcing or packing filler, hydroxyl functional silicone resins, pigments, or adhesion promoters.

Non siliceous minerals that may be included as semi-reinforcing or packing mineral fillers can be chosen from the group constituted of: carbon black, titanium dioxide, aluminium oxide, hydrated alumina, calcium carbonate, ground quartz, diatomaceous earth, zinc oxide, mica, talc, iron oxide, barium sulfate and slaked lime.

Silicone resin denotes an organopolysiloxane comprising at least one T and/or one Q siloxy unit with Q: $SiO_{2/2}$ and T: $R1SiO_{3/2}$. The hydroxyl functional silicone resin are well known and can be chosen from MQ(OH), MDT(OH), or DT(OH) resins with M: $R1R2R3SiO_{1/2}$, D:$R1R2SiO_{2/2}$, Q(OH): $(OH)SiO_{3/2}$, and T(OH): $(OH)R1SiO_{2/2}$, the R1, R2 and R3 groups being chosen independently of one another from:
  linear or branched alkyl groups having from 1 to 8 carbon atoms inclusive, optionally substituted by one or more halogen atoms; and
  aryl or alkylaryl groups containing from 6 to 14 carbon atoms inclusive.

Preferably, the hydroxyl functional silicone resin is a MQ(OH) resin.

Crosslinking Inhibitor F

The crosslinkable silicone composition X can comprise a crosslinking inhibitor F. In a specific embodiment, the crosslinkable silicone composition X does not comprise a crosslinking inhibitor F. In another specific embodiment, the crosslinkable silicone composition X comprises a crosslinking inhibitor F. Crosslinking inhibitors are commonly used in addition crosslinking silicone compositions to slow the curing of the composition at ambient temperature. The crosslinking inhibitor F may be chosen from the following compounds:
  acetylenic alcohols.
  organopolysiloxanes substituted with at least one alkenyl that may optionally be in cyclic form, tetramethylvinyltetrasiloxane being particularly preferred,
  pyridine,
  organic phosphines and phosphites,
  unsaturated amides, and
  alkyl and allyl maleates.

These acetylenic alcohols (Cf. FR-B-1 528 464 and FR-A-2 372 874), which are among the preferred hydrosilylation-reaction thermal blockers, have the formula:
  (R')(R")(OH)C—C≡CH in which:
  R' is a linear or branched alkyl radical, or a phenyl radical; and
  R" is H or a linear or branched alkyl radical, or a phenyl radical; the radicals R' and R" and the carbon atom a to the triple bond possibly forming a ring.

The total number of carbon atoms contained in R' and R" being at least 5 and preferably from 9 to 20. For the said acetylenic alcohols, examples that may be mentioned include:
  1-ethynyl-1-cyclohexanol;
  3-methyl-1-dodecyn-3-ol;
  3,7,11-trimethyl-1-dodecyn-3-ol;
  1,1-diphenyl-2-propyn-1-ol;
  3-ethyl-6-ethyl-1-nonyn-3-ol;
  2-methyl-3-butyn-2-ol;
  3-methyl-1-pentadecyn-3-ol; and
  diallyl maleate or diallyl maleate derivatives.

In a preferred embodiment, the crosslinking inhibitor is 1-ethynyl-1-cyclohexanol To obtain a longer working time or "pot life", the quantity of the inhibitor is adjusted to reach the desired "pot life". The concentration of the catalyst inhibitor in the present silicone composition is sufficient to slow curing of the composition at ambient temperature. This concentration will vary widely depending on the particular inhibitor used, the nature and concentration of the hydrosilylation catalyst, and the nature of the organohydrogenopolysiloxane. Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. The optimum concentration for an inhibitor in a given silicone composition can be readily determined by routine experimentation.

Advantageously, the amount of the crosslinking inhibitor F in the addition-crosslinking silicone compositions is in the range from 0.01% to 0.2% weight, preferably from 0.03% to 0.15% weight with respect to the total weight of the crosslinkable silicone composition X. The use of the inhibitor is effective to avoid the premature curing of the silicone composition on the tip of the nozzle and subsequent disfiguration of the printed layer.

In a preferred embodiment, the crosslinkable silicone composition X of the invention comprises, per 100% weight of the silicone composition:
  from 45 to 80% weight of at least one organopolysiloxane compound A,
  from 0.1 to 10% weight of at least one organohydrogenopolysiloxane compound B,
  from 0.05 to 3% weight of at least one thixotropic agent D,
  from 5 to 40% weight of at least one filler E,
  from 0.001 to 0.01% weight of platinum and
  optionally from 0.01 to 0.2% weight of at least one crosslinking inhibitor F.

According to an embodiment, the crosslinkable silicone composition X comprises:
  (A) at least one organopolysiloxane compound A comprising, per molecule, at least two C2-C6 alkenyl radicals bonded to silicon atoms;

(B) at least one organohydrogenopolysiloxane compound B comprising, per molecule, at least two hydrogen atoms bonded to an identical or different silicon atom;
(C) at least one catalyst C comprising at least one metal or compound, from the platinum group;
(D) at least one thixotropic agent D selected organopolysiloxanes having, per mole, at least one unit of general formula:

$$(R)_a(X)_bZSiO_{(3-(a+b))/2} \tag{D1}$$

wherein:
the R symbols are identical or different and represent a monovalent hydrocarbon radical selected from the group consisting of a linear or branched alkyl radical having from 1 to 6 carbon atoms, a phenyl radical and a 3,3,3-trifluoropropyl radical;
the X symbols are identical or different and represent a monovalent radical selected from the group consisting of a hydroxyl group, an alkenyl radical and an alkoxy radical, having from 1 to 3 carbon atoms;
Z represents a group having sterically hindered piperidinyl group(s) selected from the group consisting of groups of formula (I):

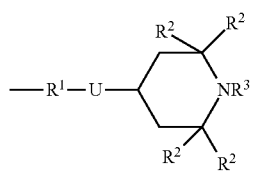
(I)

wherein:
$R^1$ is a linear or branched alkylene radical having from 2 to 18 carbon atoms; an alkylenecarbonyl radical whose linear or branched alkylene part has 2 to 20 carbon atoms; an alkylenecyclohexylene radical, whose linear or branched alkylene part has from 2 to 12 carbon atoms and the cyclohexylene part has an —OH group and, optionally, 1 or 2 alkyl radicals having from 1 to 4 carbon atoms; a radical of formula —$R^4$—O—$R^5$— wherein the $R^4$ and $R^5$ radicals, identical or different, represent alkylene radicals having 1 to 12 carbon atoms; a radical of formula —$R^4$—O—$R^5$— wherein the $R^4$ and $R^5$ radicals have the meanings indicated above and one or both of them are substituted by one or two OH group(s); a radical of formulae —$R^4$—COO—$R^5$— and —$R^4$—OCO—$R^5$— wherein $R^4$ and $R^5$ have the above meanings; or a radical of formula —$R^6$—O—$R^7$—O—CO—$R^8$— wherein $R^6$, $R^7$ and $R^8$, identical or different, represent alkylene radicals having from 2 to 12 carbon atoms and the $R^7$ radical is optionally substituted by a hydroxyl group;
U can be present or absent, and, if present, U represents —O— or —$NR^9$—, $R^9$ being a hydrogen atom; a linear or branched alkyl radical having from 1 to 6 carbon atoms;
$R^2$ identical or different are from linear or branched alkyl radicals having from 1 to 3 carbon atoms or a phenyl radical; and
$R^3$ represents a hydrogen atom or the $R^2$ radical;
a is a number chosen from 0, 1 and 2;
b is a number chosen from 0, 1 and 2; and
a+b is at most equal to 2;

(E) at least one filler E; and
(F) optionally at least one crosslinking inhibitor F.

Other Additives

The crosslinkable silicone composition X can further comprise functional additives usual in silicone composition. The following functional families of additives can be cited:
adhesion promoter;
silicone resins;
rheological modifiers such as thixotropic agents, viscosity moderator, and yield stress agent,
color agents, including phosphorescent agents and chromic pigments such as photochromic pigments, thermochromic pigments, electrochromic pigments, piezochromic pigments, solvatechromic pigments and carsolchromic pigments; and
additives for thermal resistance, oil resistance and fire resistance, for example metallic oxides.

Adhesion promoters are largely used in silicone composition. Advantageously, in the process according to the invention it is possible to use one or adhesion promoter chosen in the group consisting of:
alkoxylated organosilanes comprising, per molecule, at least one $C_2$-$C_6$ alkenyl group,
organosilicate compounds comprising at least an epoxy radical
chelates of metal M and/or metallic alkoxydes of formula:

$M(OJ)_n$, in which

M is chosen in the group consisting of: Ti, Zr, Ge, Li, Mn, Fe, Al and Mg or their mixtures, n=valence of M and J=linear or branched alkyl in $C_1$-$C_8$, Preferably M is chosen in the group consisting of: Ti, Zr, Ge, Li or Mn, and more preferably M is Titane. It is possible to associate for example an alkoxy radical of butoxy type.

Silicon resins are branched organopolysiloxanes well known and commercially available. They present, in their structure, at least two different units chosen among those of formula $R_3SiO_{1/2}$ (M unit), $R_2SiO_{2/2}$ (D unit), $RSiO_{3/2}$ (T unit) and $SiO_{4/2}$ (Q unit), at least one of these units being a T or Q unit.

Radical R are identical or different and chosen in the group consisting in alkyl linear or branched in C1-C6, hydroxyl, phenyl, trifluoro-3,3,3 propyl. Alkyl radicals are for example methyl, ethyl, isopropyl, tertiobutyl and n-hexyl.

As examples of branched oligomers or organopolysiloxanes polymers, there can be cited MQ resins, MDQ resins, TD resins and MDT resins, the hydroxyl functions can be carried by M, D and/or T units. As examples of resins that are particularly well suited, there can be cited hydroxylated MDQ resin having from 0.2 to 10% by weight of hydroxyl group.

Multi-Part Composition

The crosslinkable silicone composition X can be a one-part composition comprising components A to E in a single part or, alternatively, a multi-part composition comprising these components in two or more parts, provided components B, and C are not present in the same part. For example, a multi-part composition can comprise a first part containing a portion of component A and all of component C, and a second part containing the remaining portion of component A and all of component B. In certain embodiments, component A is in a first part, component B is in a second part separate from the first part, and component C is in the first part, in the second part, and/or in a third part separate from the first and second parts. Components D, E and F may be present in a respective part (or parts) along with at least one of components B, or C, and/or can be in a separate part (or parts).

The one-part composition is typically prepared by combining the principal components and any optional ingredients in the stated proportions at ambient temperature. Although the order of addition of the various components is not critical if the composition is to be used immediately, the hydrosilylation catalyst is typically added last at a temperature below about 30° C. to prevent premature curing of the composition.

Also, the multi-part composition can be prepared by combining the components in each part. Combining can be accomplished by any of the techniques understood in the art such as, blending or stirring, either in a batch or continuous process in a particular device. The particular device is determined by the viscosity of the components and the viscosity of the final composition.

In certain embodiments, when the crosslinkable silicone compositions X are multipart silicone compositions, the separate parts of the multi-part crosslinkable silicone composition may be mixed in a dispense printing nozzle, e.g. a dual dispense printing nozzle, prior to and/or during printing. Alternatively, the separate parts may be combined immediately prior to printing.

Organopolysiloxane of Formula (D7)

The invention also relates to an organopolysiloxane of formula (D7):

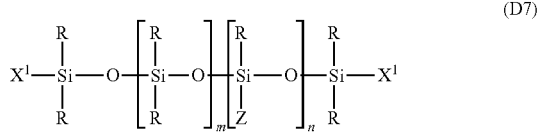
(D7)

Wherein:
the R symbols are identical or different and represent a monovalent hydrocarbon radical selected from the group consisting of a linear or branched alkyl radical having from 1 to 6 carbon atoms, a phenyl radical and a 3,3,3-trifluoropropyl radical;
the $X^1$ symbols are identical or different and represent alkenyl radical having 2 to 6 carbon atoms;
Z represents a group having sterically hindered piperidinyl group(s) of formula (I):

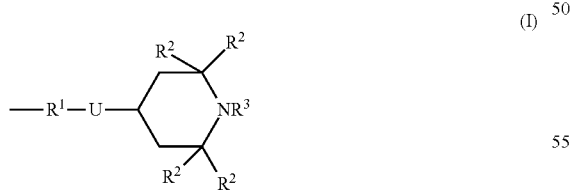
(I)

wherein:
$R^1$ is a linear or branched alkylene radical having from 2 to 18 carbon atoms; an alkylenecarbonyl radical whose linear or branched alkylene part has 2 to 20 carbon atoms; an alkylenecyclohexylene radical, whose linear or branched alkylene part has from 2 to 12 carbon atoms and the cyclohexylene part has an —OH group and, optionally, 1 or 2 alkyl radicals having from 1 to 4 carbon atoms; a radical of formula —$R^4$—O—$R^5$— wherein the $R^4$ and $R^5$ radicals, identical or different, represent alkylene radicals having 1 to 12 carbon atoms; a radical of formula —$R^4$—O—$R^5$— wherein the $R^4$ and $R^5$ radicals have the meanings indicated above and one or both of them are substituted by one or two OH group(s); a radical of formulae —$R^4$—COO—$R^5$— and —$R^4$—OCO—$R^5$— wherein $R^4$ and $R^5$ have the above meanings; or a radical of formula —$R^6$—O—$R^7$—O—CO—$R^8$— wherein $R^6$, $R^7$ and $R^8$, identical or different, represent alkylene radicals having from 2 to 12 carbon atoms and the $R^7$ radical is optionally substituted by a hydroxyl group;

U can be present or absent, and, if present, U represents —O— or —$NR^9$—, $R^9$ being a hydrogen atom; a linear or branched alkyl radical having from 1 to 6 carbon atoms; a divalent radical —$R^1$— which has the meaning indicated above, one of the valency bonds being connected to the nitrogen atom of —$NR^9$— and the other being connected to a silicon atom; or a divalent radical of formula:

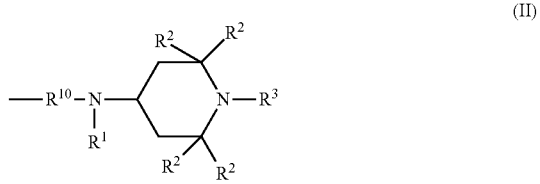
(II)

wherein $R^1$ has the meaning indicated above, $R^2$ and $R^3$ have the meanings indicated below and $R^{10}$ represents a linear or branched alkylene radical having 1 to 12 carbon atoms, one of the valency bonds (that of $R^{10}$) being connected to the nitrogen atom of —$NR^9$— and the other (that of $R^1$) being connected to a silicon atom; $R^2$ identical or different are from linear or branched alkyl radicals having from 1 to 3 carbon atoms or a phenyl radical;

$R^3$ represents a hydrogen atom or the $R^2$ radical;
m is between 0 and 2,000, preferably between 1 and 1,700, more preferably between 75 and 1,600, and
n is between 1 and 50, preferably between 1 and 25, more preferably between 2 and 20.

Preferably, in the groups of formula (I):
$R^1$ is a linear or branched alkylene radical having from 2 to 18 carbon atoms, preferably 2 to 6 carbon atoms;
U represents —O—;
$R^2$ identical or different are from linear or branched alkyl radicals having from 1 to 3 carbon atoms; and
$R^3$ represents a hydrogen atom.

Advantageously, the organopolysiloxane is of formula (D7'):

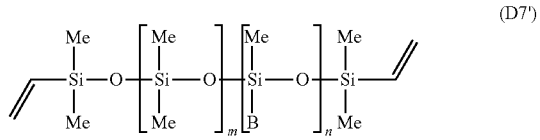
(D7')

-continued

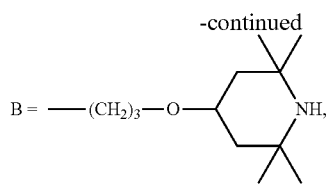

wherein
- m is between 0 and 2,000, preferably between 1 and 1,700, more preferably between 75 and 1,600, and even more preferably m is 100, and
- n is between 1 and 50, preferably between 1 and 25, more preferably between 2 and 20, and even more preferably n is 2.

In an embodiment, the organopolysiloxane is of formula (D7') wherein m is 100 and n is 2.

The invention also relates to a method for synthesizing a compound of formula (D7), said method comprising the following steps:
1. bringing into contact a divinyltetramethyldisiloxane, a cyclic polydimethylsiloxane, and a cyclic polymethylsiloxane comprising functional groups Z linked to silicon atoms;
2. heating, introducing a basic catalyst, for example a strong base, and leaving to react; and
3. neutralizing, for example with the aid of an acid, and then isolating the organopolysiloxanes comprising the functional groups Z for example by means of a standard devolatilization; cooling and withdrawing.

The invention also relates to a composition comprising an organopolysiloxane of formula (D7).

The organopolysiloxane of formula (D7) has vinyl groups, this compound can therefore be used as a substrate in the polyaddition reaction. Consequently, after reaction, the organopolysiloxane of formula (D7) is part of the crosslinked network, and there is no risk of migration of this organopolysiloxane. As a consequence, the silicone elastomer article obtained after crosslinking has a low level of extractable compounds and/or a lower toxicity.

The following examples are intended to illustrate and not to limit the invention.

EXAMPLES

Raw Materials

Unless otherwise stated, the quantities are expressed in wt. %. The nitrogen content can be expressed in ppm.

Thixotropic Agent D

Table 1 summarizes the characteristic of the tested thixotropic agents D.

TABLE 1

| Reference | Formula | N [wt. %] | Viscosity (mPa.s) |
|---|---|---|---|
| $D_A$ | D6 | 0.31 | 10000 |
| $D_B$ | D6 | 0.37 | 250 |
| $D_C$ | D7' (m = 100, n = 2) | 0.36 | 249 |
| $D_D$ | D8 (n = 2) | 5.1 | ND |

ND = not determined

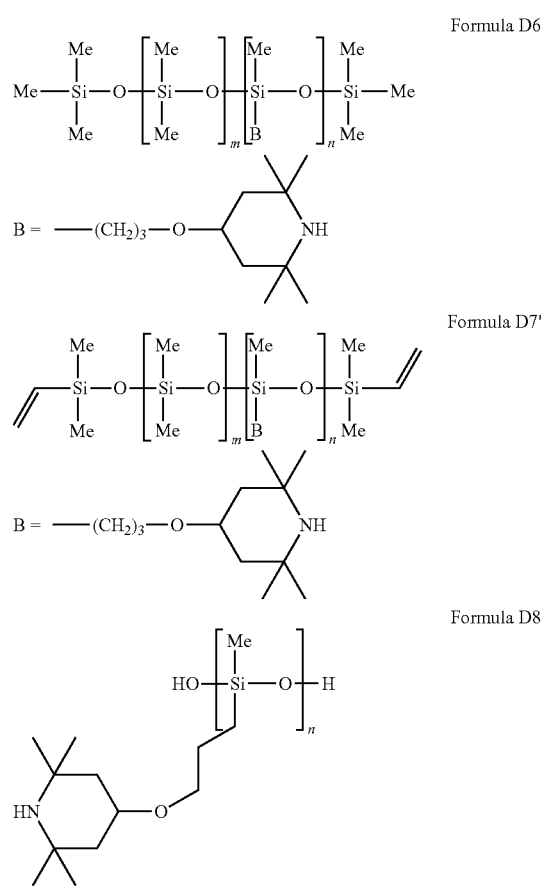

The thixotropic agent Dc was prepared as follows: in a 500 mL round bottom flask containing a stirring magnet were loaded 9.4 g of divinyltetramethyldisiloxane, 448.0 g of octamethylcyclotetrasiloxane and 29.8 g of tetramethyl-tetra(2,2,6,6-tetramethyl-4-(propoxy)piperidine)cyclotetrasiloxane. The mixture was then heated at 160° C., and 3.8 g of potassium silanolate were added at once. The reaction was carried on for 3 h at 160° C., then 7.8 g of siloxane phosphonic acid were added. After confirming the neutralization of the catalyst through colorimetric test, the volatiles were removed under vacuum at 180° C. for 2 h.

Analysis:
- Viscosity=249 mPa·s the viscosity was measured using a using a rheometer with a cone plate geometry, at 100 rpm at 25° C.
- Nitrogen content=0.36%, the nitrogen content was determined by potentiometry using perchloric acid,
- Vinyl content=0.53%, the vinyl content was determined via ethoxylation of the vinyl functions and quantification using GC headspace.

LSR Composition

A mixer is loaded with:
- 29 parts dimethylpolysiloxane oil blocked at both ends by $Me_2ViSiO_{1/2}$ units, having a viscosity of 60,000 mPa·s
- 29 parts of a dimethylpolysiloxane blocked at both ends by $Me_2ViSiO_{1/2}$ units, having a viscosity of 100,000 mPa·s
- 26 parts of silica fumed with a specific surface area measured by the BET method of 300 m²/g and 7 parts of hexamethyldisilazane.

The whole is heated at 70° C. under agitation for 1 hour and then devolatilised, cooled and stored as Base 1 of the composition 1

To 45 parts of this Base 1 is then added in a speed mixer:
Platinum metal which is introduced in the form of an organometallic complex at 10% by weight of Platinum metal, known as Karstedt's catalyst diluted in a vinyl oil.
3 parts: dimethylpolysiloxane oil having vinyl groups in the chain and at the chain ends and having a viscosity of 1,000 mPa·s
2 parts of a dimethylpolysiloxane oil having vinyl groups in the chain and at the chain ends and having a viscosity of 400 mPa·s The composition called LSR composition 1 part A is mixed during one minute at 1,000 rounds per minute in the speed mixer. The Pt content is 10 ppm.

To 45 parts of this Base 1 is then added in a speed mixer:
1.3 parts of an organohydrogenopolysiloxane M'Q resin comprising Si—H groups
0.5 parts of a linear organohydrogenopolysiloxane comprising Si—H groups in the chain and at chain ends and containing approximately 20% by weight of groups Si—H
1.5 parts of a dimethylpolysiloxane oil having vinyl groups in the chain and at the chain ends and having a viscosity of 400 mPa·s
1.6 parts: dimethylpolysiloxane oil having vinyl groups in the chain and at the chain ends and having a viscosity of 1000 mPa·s
0.08 parts of ethynyl-1-cyclohexanol-1 as crosslinking inhibitor.

The composition called LSR composition 1 part B is mixed during one minute at 1,000 rounds per/minute in the speed mixer The same amount of thixotropic additive D is then added to part A and B, using a speed mixer. Afterwards, part A and part B are mixed with a 1:1 ratio.

RTV Compositions

TABLE 2

| RTV n° 1 and RTV n° 2 | | | | |
|---|---|---|---|---|
| | RTV n° 1 | | RTV n° 2 | |
| | Part A | Part B | Part A | Part B |
| dimethylpolysiloxane oil blocked at both ends by $Me_2ViSiO_{1/2}$ units, having a viscosity of 600 mPa.s | 52.8 | 51.5 | 52.3 | 53.2 |
| Fumed silica trested with hexamethyldisilazane | 27.2 | 26.5 | 24.6 | 25.0 |
| dimethylpolysiloxane oil blocked at both ends by $Me_2ViSiO_{1/2}$ units, having a viscosity of 50 mPa.s | 20 | 11.7 | 23.1 | 18 |

TABLE 2-continued

| RTV n° 1 and RTV n° 2 | | | | |
|---|---|---|---|---|
| | RTV n° 1 | | RTV n° 2 | |
| | Part A | Part B | Part A | Part B |
| linear organohydrogenopolysiloxane comprising Si-H groups in the chain and at chain ends and containing approximately 7.5% by weight of groups Si-H | — | 5.5 | — | 3.8 |
| linear organohydrogenopolysiloxane comprising Si-H groups at chain ends and containing approximately 5.5% by weight of groups Si-H | — | 4.8 | — | — |
| organometallic complex at 10% by weight of Platinum metal (Karstedt's catalyst) diluted in a vinyl oil | 0.025 | — | 0.025 | — |
| ethynyl-1-cyclohexanol-1 as crosslinking inhibitor | — | 0.06 | — | — |

Properties of the LSR Compositions
3D Printability

The yield stress was determined by rotational shear measurement, at 25° C., using a rheometer Haake Mars, with a cone plate geometry of 20 mm diameter and a cone angle of 20. The rotational shear measurement was carried out as follows: 120 s to go from 0 to 20 $s^{-1}$, and 120 s to go from 20 to 0 $s^{-1}$. Then, the measured stress is plotted in function of the shear stress applied. The linear part of the obtained curve from 20 to 0 $s^{-1}$ is then used to determine the yield stress (approximately from 20 to 2.5 $s^{-1}$). A linear regression is performed on this linear part of the curve to determine the yield stress, which corresponds to the intercept.

In order to evaluate the crosslinking and the 3D printability of the composition, part A and part B were each put into cartridge, when possible, and printed using an extrusion printer LDM (liquid deposition modeling process) Deltatower with a conic nozzle of diameter 410 μm at 25° C.

The crosslinking after storage is evaluated as follows: if the crosslinking rate after 1 month storage is at least equivalent to 80% of the nominal value measured at time initial at the same temperature, then the composition could be considered as stable (corresponding to "Ok" in table 3).

The 3D printability is evaluated as follows: while the silicone composition is being printed, the layers must retain their extruded shape without significant slumping to support the layers being built above. In case of slumping issue is identified, the printability of the silicone composition is considered as weak (corresponding to "No" in table 3). If no slumping is observed, the printability of the silicone composition is considered as strong (corresponding to "Ok" in table 3).

Table 3 summarizes the results obtained for the different compositions.

TABLE 3

| Thixotropic agent D | $D_A$ | $D_B$ | $D_C$ | $D_D$ | | | | | None (LSR) |
|---|---|---|---|---|---|---|---|---|---|
| Example | 1 | 2 | 3 | 4 | 5 | 6 | 7 | 8 | Comp.Ex 1 |
| Wt. % of D | 2.3% | 1.3% | 2% | 6.9% | 1.3% | 0.14% | 0.35% | 1.3% | — |
| N content in the composition | 71 ppm | 48 ppm | 74 ppm | 255 ppm | 47 ppm | 71 ppm | 179 ppm | 663 ppm | — |
| Cross linking after storage | Ok | Ok | Ok | No | Ok | Ok | Ok | No | Ok |

TABLE 3-continued

| Thixotropic agent D | $D_A$ | $D_B$ | | | $D_C$ | $D_D$ | | | None (LSR) |
|---|---|---|---|---|---|---|---|---|---|
| Example | 1 | 2 | 3 | 4 | 5 | 6 | 7 | 8 | Comp.Ex 1 |
| Yield stress (Pa) | 2100 | 500 | 2050 | 2100 | 1100 | 1600 | 2100 | 5000 | 450 |
| Put into cartridge | Ok | Ok | Ok | — | Ok | Ok | Ok | No | Ok |
| 3D Printability | Ok | Ok | Ok | — | Ok | Ok | Ok | — | No |

—: no data

These results show that the compositions according to the invention can be put into cartridges and printed with a 3D printer (ex. 1-3 and 5-7). On the contrary, if the nitrogen content in the composition is too high, the composition is not suitable for 3D printing as it shows crosslinking problem (ex. 4) and/or the yield stress is too high, so the composition cannot be put into cartridges (ex. 8).

Mechanical Properties

The mechanical properties of the obtained compositions have also been tested. The tests have been performed on moulded plates.

The hardness (Shore A) has been determined according to the DIN 53505-A method.

The stress at break and the elongation at break have been measured according to the NF ISO 37 method (2011 version). The tests were performed on dumbbell shaped specimen of type 2 (H2). The traction speed was 500 mm/min and the measurement was done at room temperature. An extensometer was used to measure the elongation at break.

The tear strength has been determined according to the ASTM D624 method, 2012 version. The sample shape was of type A. The traction speed was 500±50 mm/min and the measurement was done at room temperature.

Table 4 summarizes the results that were obtained.

TABLE 4

| Thixotropic agent D Example | $D_A$ | $D_B$ | | | $D_C$ | $D_D$ | | None (LSR) |
|---|---|---|---|---|---|---|---|---|
| | 1 | 2 | 3 | 4 | 5 | 6 | 7 | Comp.Ex 1 |
| Wt. % of D | 2.3% | 1.3% | 2% | 6.9% | 1.3% | 0.14% | 0.35% | — |
| Hardness (±1 Sh.A) | 55 | 55 | 53 | 50 | 56 | 57 | 51 | 55 |
| Stress at break (±0.8 MPa) | 8.3 | 8.6 | 9.1 | 7.3 | 8.2 | 8.9 | 7.9 | 9.1 |
| Elongation at break (±75%) | 523 | 505 | 566 | 544 | 494 | 539 | 514 | 561 |
| Tear strength (±3.0 N/mm) | 40.2 | 43.6 | 43.5 | 40.0 | 43.3 | 39.7 | 41.2 | 50.3 |

These results show that there is no modification of the mechanical properties for the compositions comprising a thixotropic agent D compared to the composition with no thixotropic agent.

Crosslinking Rate

The crosslinking rate of the compositions according to examples 2-4 have been determined by rheometry at 115° C., according to ISO 6502, with a torsional oscillatory shear measurement at 1.67 Hz and a range of 0.5. The results are shown in Table 5.

TABLE 5

| Thixotropic agent D | $D_B$ | | |
|---|---|---|---|
| Example | 2 | 3 | 4 |
| Wt. % of D | 1.3% | 2% | 6.9% |
| N content in the composition | 48 ppm | 74 ppm | 255 ppm |
| Peak rate in dN/min | 19.4 | 18.4 | 6.0 |

These results show that the compositions according to the invention (ex. 2-3) have a crosslinking rate that is high enough to be used in 3D printing. On the contrary, if the nitrogen content in the composition is too high (ex. 4), the crosslinking rate is too low, and the composition cannot be used in 3D printing.

Properties of the RTV Composition

The dynamic viscosity of the RTV n°1 composition with and without 0.1% wt of $D_D$ (nitrogen content: 51 ppm) was measured with a Brookfield viscosimeter at 25° C. The results are shown in table 6.

TABLE 6

| Viscosity spindle 7 (Pa.s) | Part A With 0.1% $D_D$ | Part B With 0.1% $D_D$ | Part A Without $D_D$ | Part B Without $D_D$ |
|---|---|---|---|---|
| 0.5 rpm | 1080 | 2060 | 2 | 4 |
| 1 rpm | 592 | 1120 | 2 | 4 |
| 2 rpm | 320 | 598 | 2 | 5 |
| 2.5 rpm | 260 | 446 | 3.2 | 5.5 |
| 4 rpm | 174 | 283 | 3 | 5.5 |
| 5 rpm | 142 | 256 | 2.8 | 6 |

TABLE 6-continued

| Viscosity spindle 7 (Pa.s) | Part A With 0.1% $D_D$ | Part B With 0.1% $D_D$ | Part A Without $D_D$ | Part B Without $D_D$ |
|---|---|---|---|---|
| 10 rpm | 81 | 146 | 3.2 | 5 |
| 20 rpm | 47 | 80 | 3.2 | 4.5 |
| 50 rpm | 23 | 38 | 2.9 | 4 |
| 100 rpm | 14 | 22 | 2.7 | 3.8 |

The results show that the composition according to the invention has good rheological properties. In particular, when low shear rate is applied, the composition has a high viscosity, and when a high shear rate is applied, the viscosity of the composition is greatly lowered. The composition can therefore be used in 3D printing. Indeed, for successful printing, the silicone composition must flow at a controlled shear rate through the deposition head with modest pressure and retain the extruded shape without significant slumping.

In order to evaluate the crosslinking and the 3D printability of the RTV compositions n°1 and 2, part A and part B were each put into cartridge, when possible, and printed using an extrusion printer LDM (liquid deposition modeling process) Deltatower with a nozzle of 410 μm at 25° C.

Table 7 summarizes the results obtained for the different compositions

TABLE 7

| RTV compositions Thixotropic agent D | RTV n° 1 $D_D$ | $D_B$ | RTV n° 2 $D_D$ | |
|---|---|---|---|---|
| Example | 9 | 10 | 11 | 12 |
| Wt. % of D | 0.1% | 0.658% | 0.047% | 1.0% |
| N content in the composition | 51 ppm | 25 ppm | 25 ppm | 510 ppm |
| Crosslinking after storage | Ok | Ok | Ok | No |
| 3D Printability | Ok | No | No | Ok |

These results show that the compositions according to the invention can be printed with a 3D printer (ex. 9). However, if the nitrogen content in the composition is too high, the composition is not suitable for 3D printing as it shows crosslinking problem after storage (ex. 12). Moreover, if the nitrogen content in the composition is too low, the composition cannot be printed using a 3D printer (ex. 10 and 11).

3D Printing Using the RTV n° 1 Composition

The 3D printing has been done using a Delta Tower 3D printer comprising a 2-component Viscotec dosage system equipped with a static mixer for the 2K silicone composition. Part A and part B of the RTV n° 1 composition were each put in a cartridge.

An elastomer article representing a star wheel of 1 cm height was printed using parts A and B, using a nozzle of 200 μm, and with a speed of 10 mm/s.

The printed silicone star wheel has the same mechanical properties as an injected star wheel.

The invention claimed is:

1. A method for additive manufacturing of a silicone elastomer article using a 3D printer, selected from an extrusion 3D printer and a 3D jetting printer, said method comprising:
    1) printing a crosslinkable silicone composition X on a substrate, to form a first layer;
    2) printing the crosslinkable silicone composition X on the first or previous layer, to form a subsequent layer;
    3) optionally repeating 2); and
    4) allowing the first and subsequent layers to crosslink, optionally by heating, to obtain a silicone elastomer article; wherein the crosslinkable silicone composition X comprises:
        (A) at least one organopolysiloxane compound A comprising, per molecule, at least two C2-C6 alkenyl radicals bonded to silicon atoms;
        (B) at least one organohydrogenopolysiloxane compound B comprising, per molecule, at least two hydrogen atoms bonded to an identical or different silicon atom;
        (C) at least one catalyst C comprising at least one metal or compound, from the platinum group,
        (D) at least one thixotropic agent D selected from organosilicon compounds containing, per molecule, at least one cyclic amine functional group;
        (E) at least one filler E; and
        (F) optionally at least one crosslinking inhibitor F;
    said crosslinkable silicone composition X having a nitrogen content between 0.003 and 0.02 wt. %, optionally between 0.004 and 0.017 wt. %, and optionally between 0.0045 and 0.016 wt. %.

2. The method of claim 1, wherein the cyclic amine functional group of the thixotropic agent D is a piperidinyl functional group.

3. The method according to claim 1, wherein the thixotropic agent D is an organopolysiloxane having, per mole, at least one unit of formula (D1):

$$(R)_a(X)_bZSiO_{3-(a+b)/2} \quad (D1)$$

wherein:
    the R symbols are identical or different and represent a monovalent hydrocarbon radical selected from the group consisting of a linear or branched alkyl radical having from 1 to 6 carbon atoms, a phenyl radical and a 3,3,3-trifluoropropyl radical;
    the X symbols are identical or different and represent a monovalent radical selected from the group consisting of a hydroxyl group, an alkenyl radical having 2 to 6 carbon atoms, and an alkoxy radical having from 1 to 6 carbon atoms;
    Z represents a group having sterically hindered piperidinyl group(s) of formula (I):

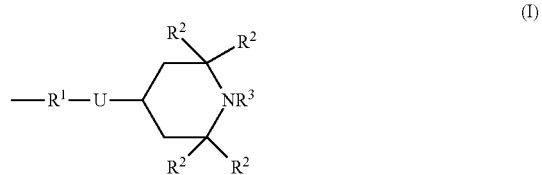

(I)

wherein:
    $R^1$ is a linear or branched alkylene radical having from 2 to 18 carbon atoms; an alkylenecarbonyl radical whose linear or branched alkylene part has 2 to 20 carbon atoms; an alkylenecyclohexylene radical, whose linear or branched alkylene part has from 2 to 12 carbon atoms and the cyclohexylene part has an —OH group and, optionally, 1 or 2 alkyl radicals having from 1 to 4 carbon atoms; a radical of formula —$R^4$—O—$R^5$— wherein the $R^4$ and $R^5$ radicals, identical or different, represent alkylene radicals having 1 to 12 carbon atoms; a radical of formula —$R^4$—O—$R^5$— wherein the $R^4$ and $R^5$ radicals have the meanings indicated above and one or both of them are substituted by one or two OH group(s); a radical of formulae —$R^4$—COO—$R^5$— and —$R^4$—OCO—$R^5$— wherein $R^4$ and $R^5$ have the above meanings; or a radical of formula —$R^6$—O—$R^7$—O—CO—$R^8$— wherein $R^6$, $R^7$ and $R^8$, identical or different, represent alkylene radicals having from 2 to 12 carbon atoms and the $R^7$ radical is optionally substituted by a hydroxyl group;

U can be present or absent, and, if present, U represents —O— or —$NR^9$—, $R^9$ being a hydrogen atom; a linear or branched alkyl radical having from 1 to 6 carbon atoms; a divalent radical —$R^1$— which has the meaning indicated above, one of the valency bonds being connected to the nitrogen atom of —$NR^9$— and the other being connected to a silicon atom; or a divalent radical of formula (II):

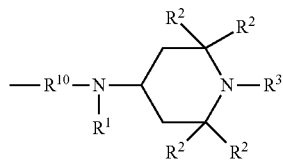 (II)

wherein $R^1$ has the meaning indicated above, $R^2$ and $R^3$ have the meanings indicated below and $R^{10}$ represents a linear or branched alkylene radical having 1 to 12 carbon atoms, one of the valency bonds (that of $R^{10}$) being connected to the nitrogen atom of —$NR^9$— and the other (that of $R^1$) being connected to a silicon atom;

$R^2$ identical or different are from linear or branched alkyl radicals having from 1 to 3 carbon atoms or a phenyl radical;

$R^3$ represents a hydrogen atom or the $R^2$ radical;

a is a number chosen from 0, 1 and 2;

b is a number chosen from 0, 1 and 2; and a+b is at most equal to 2.

4. The method according to claim 3, wherein the thixotropic agent D further comprises other siloxyl unit(s) of formula (D3):

 (D3)

wherein:

R and X have the same meanings as those given with respect to the formula (D1);

e is a number chosen from 0, 1, 2 and 3;

f is a number chosen from 0, 1, 2 and 3; and e+f is at most equal to 3.

5. The method according to claim 1 wherein the crosslinkable silicone composition X has a yield stress between 400 and 3,000 Pa, optionally between 450 and 2,500 Pa, and optionally between 500 and 2,250 Pa.

6. The method according to claim 1, wherein the 3D printer is an extrusion printer.

* * * * *